(12) United States Patent
Schulze

(10) Patent No.: US 11,793,207 B2
(45) Date of Patent: Oct. 24, 2023

(54) APPARATUS AND METHOD FOR AUTOMATICALLY RECOVERING BREAST FILLETS FROM POULTRY CARCASSES OR PARTS THEREOF

(71) Applicant: Nordischer Maschinenbau Rud. Baader GmbH + Co. KG, Lübeck (DE)

(72) Inventor: Adrian Schulze, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 201 days.

(21) Appl. No.: 17/429,478

(22) PCT Filed: Sep. 30, 2019

(86) PCT No.: PCT/EP2019/076412
§ 371 (c)(1),
(2) Date: Aug. 9, 2021

(87) PCT Pub. No.: WO2020/164759
PCT Pub. Date: Aug. 20, 2020

(65) Prior Publication Data
US 2022/0104509 A1    Apr. 7, 2022

(30) Foreign Application Priority Data
Feb. 11, 2019  (EP) .................................. 19156371

(51) Int. Cl.
*A22C 21/00*  (2006.01)
*G01N 21/84*  (2006.01)

(52) U.S. Cl.
CPC ........ *A22C 21/003* (2013.01); *A22C 21/0053* (2013.01); *G01N 21/84* (2013.01); *G01N 2201/104* (2013.01)

(58) Field of Classification Search
CPC .......................... A22C 21/003; A22C 21/0053
(Continued)

(56) References Cited

U.S. PATENT DOCUMENTS

| 5,372,539 A | 12/1994 | Kunig et al. |
| 6,299,524 B1 | 10/2001 | Janssen et al. |

(Continued)

FOREIGN PATENT DOCUMENTS

| CN | 1303234 A | 7/2001 |
| CN | 103096723 A | 5/2013 |

(Continued)

OTHER PUBLICATIONS

International Search Report dated Dec. 12, 2019; International Application No. PCT/EP2019/076412.

*Primary Examiner* — Richard T Price, Jr.
(74) *Attorney, Agent, or Firm* — DINSMORE & SHOHL LLP

(57) ABSTRACT

An apparatus for automatically recovering breast fillets from poultry bodies or parts thereof has a conveying device to continuously convey the poultry bodies in a conveying direction. The conveying device has receiving elements to hold and convey the poultry bodies along a processing path. Processing stations are arranged on the processing path and the stations include at least a furcula-removal station and a breast fillet detaching station. At least one measuring device is arranged on the processing path downstream of the breast fillet detaching station. The poultry bodies held by the receiving elements are conveyed past the measuring device such that the sternum of the poultry bodies is oriented at least substantially transversely to the conveying direction with the breast side facing the measuring device. The (Continued)

measuring device has a scanning element to mechanically scan the poultry bodies on the breast side. A corresponding method is also provided.

16 Claims, 8 Drawing Sheets

(58) Field of Classification Search
USPC ........................................................ 452/149
See application file for complete search history.

(56) References Cited

U.S. PATENT DOCUMENTS

| | | |
|---|---|---|
| 8,678,887 B2 | 3/2014 | Evers |
| 9,723,846 B2 | 8/2017 | Gutte |
| 10,015,974 B2 | 7/2018 | Van Steijn et al. |
| 10,455,842 B2 | 10/2019 | Van Esbroeck et al. |
| 2009/0137195 A1* | 5/2009 | Bottemiller ............ B26D 5/007 |
| | | 700/173 |
| 2011/0275298 A1 | 11/2011 | De Vos |
| 2013/0137353 A1 | 5/2013 | Landt |
| 2014/0318285 A1 | 10/2014 | Gutte |
| 2018/0184673 A1 | 7/2018 | Van Esbroeck et al. |
| 2020/0254641 A1* | 8/2020 | Hocker ............... A22C 17/0093 |

FOREIGN PATENT DOCUMENTS

| | | |
|---|---|---|
| CN | 107821565 A | 3/2018 |
| CN | 109068666 A | 12/2018 |
| DE | 4234040 A1 | 4/1994 |
| DE | 102006040454 B3 | 12/2007 |
| EP | 2384643 A1 | 11/2011 |
| EP | 2599387 A1 | 6/2013 |
| EP | 3162216 A1 | 5/2017 |

* cited by examiner

APPARATUS AND METHOD FOR AUTOMATICALLY RECOVERING BREAST FILLETS FROM POULTRY CARCASSES OR PARTS THEREOF

CROSS-REFERENCE TO RELATED APPLICATIONS

This application is the U.S. National Stage of PCT/EP2019/076412 filed Sep. 30, 2019, which claims priority to European Patent Application No. 19156371.7, filed Feb. 11, 2019, the content of both are incorporated herein by reference in their entirety.

FIELD OF THE INVENTION

The present invention relates to an apparatus for automatically recovering breast fillets from poultry bodies or parts thereof. The invention relates further to a method for automatically recovering breast fillets from poultry bodies or parts thereof.

BACKGROUND OF THE INVENTION

Such apparatuses and methods for recovering fillets are used in the fully or semi-automatic processing of poultry bodies, or parts of poultry bodies. A method for the mechanical recovery of the meat from poultry bodies and a device for carrying out such a method are known, for example, from document DE 42 34 040 A1 of the applicant.

The poultry bodies, or parts of poultry bodies, to be processed are breast caps. Such breast caps are obtained, for example, by means of a diagonal cut through the poultry body. Such a breast cap therefore comprises substantially parts of the thorax with the ribs, the sternum, and the furcula with the wing joints at the free ends. Adjacent thereto are on the one hand the furcula and on the other hand the scapulae. The poultry bodies, or the breast caps, are held by means of receivers and conveyed in the direction of their longitudinal axis with the wing joints leading. Along the transport path there are arranged various tools, by means of which the processing of the poultry bodies takes place sequentially.

In the known apparatuses and methods for automatically recovering breast fillets, it can happen that the breast fillet is not detached completely from the poultry body. It is therefore generally necessary to examine each poultry body and remove incorrectly filleted poultry bodies from the process as a whole by manual intervention, in order subsequently to process them manually. However, a cost-intensive use of personnel at the machine is hereby required.

SUMMARY OF THE INVENTION

Accordingly, it is an object of the present invention to propose an apparatus for automatically recovering breast fillets from poultry bodies which ensures that the success of filleting is evaluated with a high degree of reliability. A further object is to propose an apparatus which makes it possible to distinguish automatically between filleted and unfilleted or incompletely filleted poultry bodies. A further object consists in proposing a corresponding method.

The object is achieved by the apparatus mentioned hereinbefore, which comprises a conveying device configured to continuously convey the poultry bodies in a conveying direction, wherein the conveying device has receiving elements adapted to hold and convey the poultry bodies along a processing path, wherein processing stations are arranged on the processing path and the processing stations include at least a furcula-removal station and a breast fillet detaching station; furthermore at least one measuring device arranged downstream of the breast fillet detaching station in the conveying direction and arranged on the processing path, the poultry bodies held by means of the receiving elements being conveyed past the measuring device such that in each case the sternum of the poultry bodies is oriented at least substantially transversely to the conveying direction with the breast side facing the measuring device, wherein the measuring device has a scanning element which is configured and adapted to mechanically scan the poultry body on the breast side. By means of the measuring device it is recognised, fully automatically, whether the breast fillet has been detached completely from the poultry body or whether the removal of the breast fillet has taken place only partially or incompletely. The success of the filleting process is thus advantageously monitored fully automatically. In this manner it is possible to dispense with the use of cost-intensive personnel for examining each processed poultry body. A further advantage consists in that the measuring device having the scanning element for scanning the poultry body is highly robust and therefore extremely resistant to failure. In addition, the simplicity of the mechanical construction offers advantages in terms of hygiene, since it is easy to clean and meets the high hygiene standards in the field of food processing.

An expedient embodiment of the invention is characterised in that the scanning element is arranged so as to be pivotably mounted, with spring biasing, about a pivot axis. This offers the advantage that the scanning element automatically pivots in the direction towards the poultry body and, via the spring biasing, scans the breast side of the poultry body with a defined contact pressure. It is thus ensured that the scanning element is reliably in mechanical contact with the breast side of the poultry body and scans it according to the particular geometry of the poultry body in question.

A preferred further development of the invention is distinguished in that a free pivot arm end of the scanning element is oriented so as to point, starting from the pivot axis, in the conveying direction. The above-mentioned orientation offers the advantage that, although the scanning element comes into contact with the poultry body as the poultry body is conveyed past it, the poultry body is conveyed past the scanning element largely unhindered and without the risk of becoming stuck. Scanning of the poultry body thus takes place in a particularly gentle manner.

According to a further preferred embodiment of the invention, the scanning element, in a waiting position in which it is not in mechanical contact with one of the poultry bodies, is arranged, starting from the pivot axis, in an oblique position relative to the processing path, pointing towards the processing path. In other words, the scanning element is arranged such that on the one hand, in the waiting position, it is in an oblique position relative to the processing path and on the other hand is in the transport path of the poultry bodies, so that they necessarily come into mechanical contact on the breast side with the scanning element as they are conveyed past the measuring device. In this manner, reliable mechanical scanning of each of the poultry bodies is ensured.

A further expedient embodiment of the invention is characterised in that the measuring device comprises at least one sensor element which is configured and adapted to detect at least one angular position on deflection of the scanning element. By detecting an angular position on deflection of the scanning element, the sensor element can be of simple construction, since it has in principle to detect only one angular position. The sensor element can thus be designed, for example, as an inexpensive electrical scanning contact. Alternatively, it is possible that the sensor element is adapted to detect multiple angular positions on deflection of the scanning element. It is also possible that the sensor element detects the angular position of the scanning element continuously and delivers a corresponding signal representing the angular position for further evaluation.

According to a further preferred embodiment, the sensor element is in the form of an inductive sensor. This offers the advantage that the at least one angular position of the scanning element is adapted to be detectable contactlessly. The scanning element preferably comprises for this purpose a metallic side surface. The position of the inductive sensor is thereby so chosen that, at a predefined angular position, at which it is possible to distinguish whether the breast fillet is still on the poultry body or whether it has already been detached from the poultry body, the side surface of the scanning element enters the detection range of the inductive sensor. A further advantage of the inductive sensor consists in that it is fully encapsulated and does not have any moving mechanical parts, therefore it is easy to clean and resistant to the adhesion of dirt and accordingly meets the high hygiene requirements specified in the field of the processing of foods.

A further expedient embodiment of the invention comprises a control device which is configured to detect, on the basis of the at least one angular position, whether the poultry body has been freed of the breast fillet or whether the breast fillet is still present on the poultry body. The control device is thus advantageously adapted to automatically distinguish between filleted and unfilleted or incompletely filleted poultry bodies on the basis of the detected angular position.

According to a further preferred embodiment, the apparatus according to the invention comprises a discharge device which is arranged downstream of the measuring device in the conveying direction and is adapted so as to be controllable and which is configured so as to be activated by means of the control device, in the case of the detection of the presence of breast fillet on the poultry body in question, for the discharge of that poultry body and to discharge the poultry body in question. By means of the discharge device, those poultry bodies that have not been completely filleted are discharged fully automatically. These poultry bodies can be collected, for example, and subsequently fed to manual after-processing. In this manner it is ensured that poultry bodies from which the breast fillet has been completely removed are clearly separated from those poultry bodies that have been freed of the breast fillet only incompletely.

A preferred further development of the invention is distinguished in that the control device is configured to detect the presence of the breast fillet on one of the poultry bodies by means of an angular position of the scanning element which is greater than a predefined reference angular position. The presence or absence of the breast fillet on one of the poultry bodies is thus determined in a particularly simple manner. Depending on whether the breast fillet is still present on the poultry body or has already been completely removed, the scanning element is deflected by a different amount. If the breast fillet is still on the poultry body, the scanning element is deflected further against the spring biasing than if a poultry body with the breast fillet already removed passes the scanning element. The predefined reference angular position is thus so chosen that it corresponds to an angular position between the mentioned different configurations of the scanning element. The form in which the evaluation by means of the control device takes place is dependent on the choice of the type of sensor element. If an electronic scanning contact is used as the sensor element, the predefined reference angular position is determined by the geometry of the scanning element and the position of the sensor element relative to the scanning element. If a rotary encoder is used as the sensor element, the angular position signal generated by the sensor element is preferably processed in the control device and compared with a reference angular position stored in the control device. If the sensor element is in the form of an inductive sensor, the mounting position of the sensor element preferably determines the predefined reference angular position. It is common to all the implementation variants that complex algorithms do not have to be performed by means of the control device in order to evaluate whether the breast fillet is or is not still present on the poultry body. The components of the control device that are required for the evaluation are therefore inexpensive and nevertheless offer an extremely high degree of reliability in the recognition.

The object is further achieved by the corresponding method mentioned hereinbefore for automatically recovering breast fillets from poultry bodies or parts thereof, comprising the steps: continuously conveying the poultry bodies in a conveying direction by means of a conveying device, wherein the conveying device has receiving elements adapted to hold and convey the poultry bodies along a processing path, and wherein processing stations are arranged on the processing path, which processing stations include at least a furcula-removal station and a breast fillet detaching station; carrying out the removal of the furcula by means of the furcula-removal station; carrying out at least one processing step for the partial or complete detachment of the breast fillet by means of the breast fillet detaching station; conveying the poultry bodies held by means of the receiving elements past at least one measuring device arranged on the processing path downstream of the breast fillet detaching station in the conveying direction, such that in each case the sternum of the poultry bodies is oriented at least substantially transversely to the conveying direction with the breast side facing the measuring device; and mechanically scanning the poultry bodies by means of a scanning element of the measuring device. The advantages associated with the method according to the invention have already been explained in detail in connection with the apparatus according to the invention. Therefore, in order to avoid repetition, reference is made to the remarks made hereinbefore in connection with the apparatus according to the invention. The same applies to the further embodiments of the method according to the invention mentioned hereinbelow.

A further preferred configuration of the invention is characterised by deflection of the scanning element, against spring biasing, about a pivot axis as the poultry bodies are conveyed past.

A further expedient development of the invention is characterised by detection of at least one angular position by means of at least one sensor element of the measuring device on deflection of the scanning element.

According to a further preferred embodiment, the at least one angular position is detected inductively by means of the sensor element.

A further expedient configuration of the invention is characterised by detection by means of a control device of whether the poultry body has been freed of the breast fillet or whether the breast fillet is still present on the poultry body, on the basis of the at least one angular position.

A further preferred development of the invention comprises discharging one of the poultry bodies by means of a discharge device by activation of the discharge device by means of the control device in the case of the detection by means of the measuring device of the presence of breast fillet on the poultry body in question.

A further expedient configuration of the invention is characterised by detection of the presence of breast fillet on one of the poultry bodies by detection of the angular position of the scanning element, which is greater than a predefined reference angular position.

BRIEF DESCRIPTION OF THE DRAWINGS

Further preferred and/or expedient features and configurations of the invention will become apparent from the the description. Particularly preferred embodiments will be explained in greater detail with reference to the accompanying drawing, in which.

DETAILED DESCRIPTION OF THE INVENTION

Figure 1:
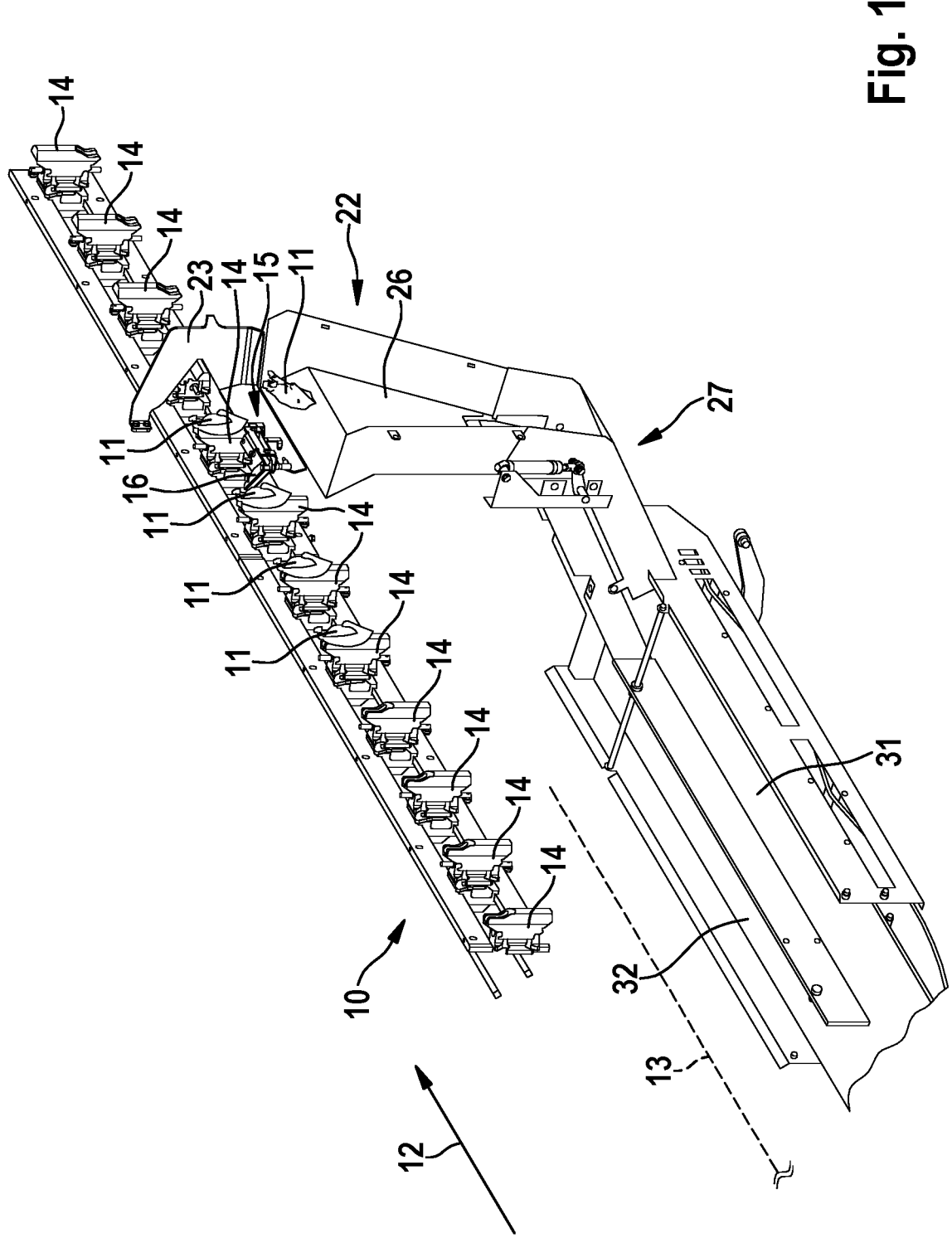
FIG. 1 is a perspective view of the apparatus according to the invention.

FIG. 1 is a perspective view of the apparatus according to the invention. The apparatus comprises a conveying device 10 which is configured and adapted to continuously convey the poultry bodies 11 in a conveying direction 12. The conveying device 10 has receiving elements 14 adapted to hold and convey the poultry bodies 11 along a processing path 13. The receiving elements 14 are preferably in the form of saddle receivers, by means of which the poultry bodies 11 can reliably be held. Arranged on the processing path 13 are processing stations—not shown in the drawing—by means of which the poultry bodies 11 are processed sequentially.

Such processing stations can include, for example, a loading station for saddling the poultry bodies onto the receiving elements 14, skinning tools for skinning the poultry bodies, and in any case a furcula-removal station and a breast fillet detaching station. By means of the furcula-removal station, the furcula of the poultry body 11 is removed from the poultry body 11, preferably by cutting tools. By means of the breast fillet detaching station, loosening of the breast fillets and complete detachment of the fillets from the poultry body 11 are carried out, for example at a detaching station.

The apparatus according to the invention further comprises at least one measuring device 15. The measuring device 15 is arranged on the processing path 13 downstream of the breast fillet detaching station when looking in the conveying direction 12. The poultry bodies 11 held by means of the receiving elements 14 are thus conveyed past the measuring device 15.

Figure 2:
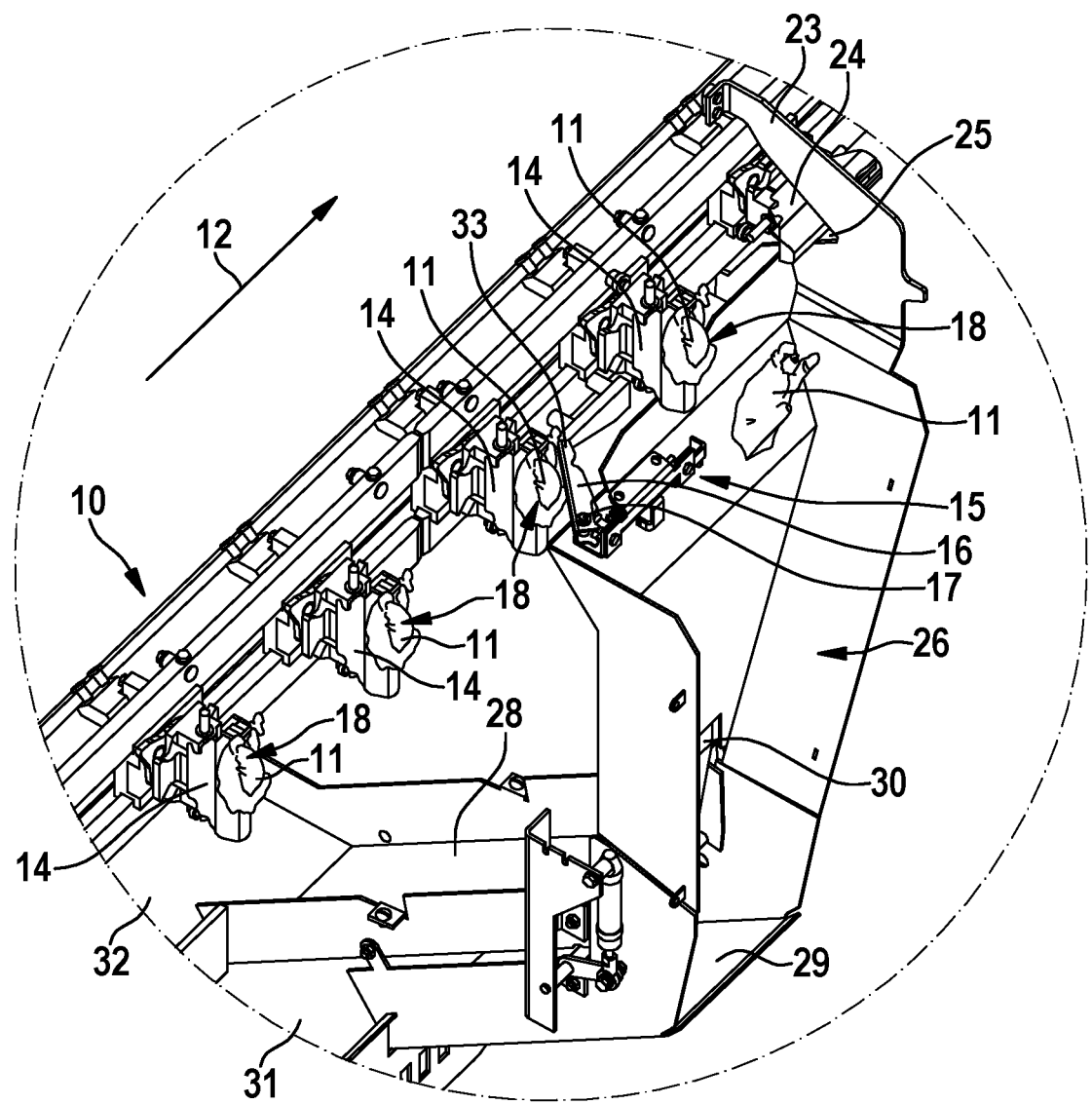
FIG. 2 is an enlarged partial view of the apparatus shown in FIG. 1.

FIG. 2 is an enlarged partial view of the apparatus shown in FIG. 1. As can be seen in FIG. 2, the conveying device 10 is configured such that in each case the sternum of the poultry bodies 11 is oriented transversely or substantially transversely to the conveying direction 12 and the breast sides of the poultry bodies 11 face the measuring device 15. The measuring device 15 has a scanning element 16. The scanning element 16 is configured and adapted to mechanically scan the poultry bodies 11 on the breast side. In other words, during the conveying of the poultry bodies 11, the scanning element 16 comes into mechanical contact with the breast side thereof and in this manner scans the poultry bodies 11 on the breast side.

The scanning element 15 is preferably arranged so as to be pivotably mounted, with spring biasing, about a pivot axis 17. By means of the spring biasing, the scanning element 16 lies against the breast side 18 of the poultry body 11 and is correspondingly deflected in dependence on the geometry of the poultry body, and in this manner the breast side 18 of the poultry body is scanned. Further preferably, a free pivot arm end 33 of the scanning element 16 is oriented so as to point, starting from the pivot axis 17, in the conveying direction 12.

Figure 7:
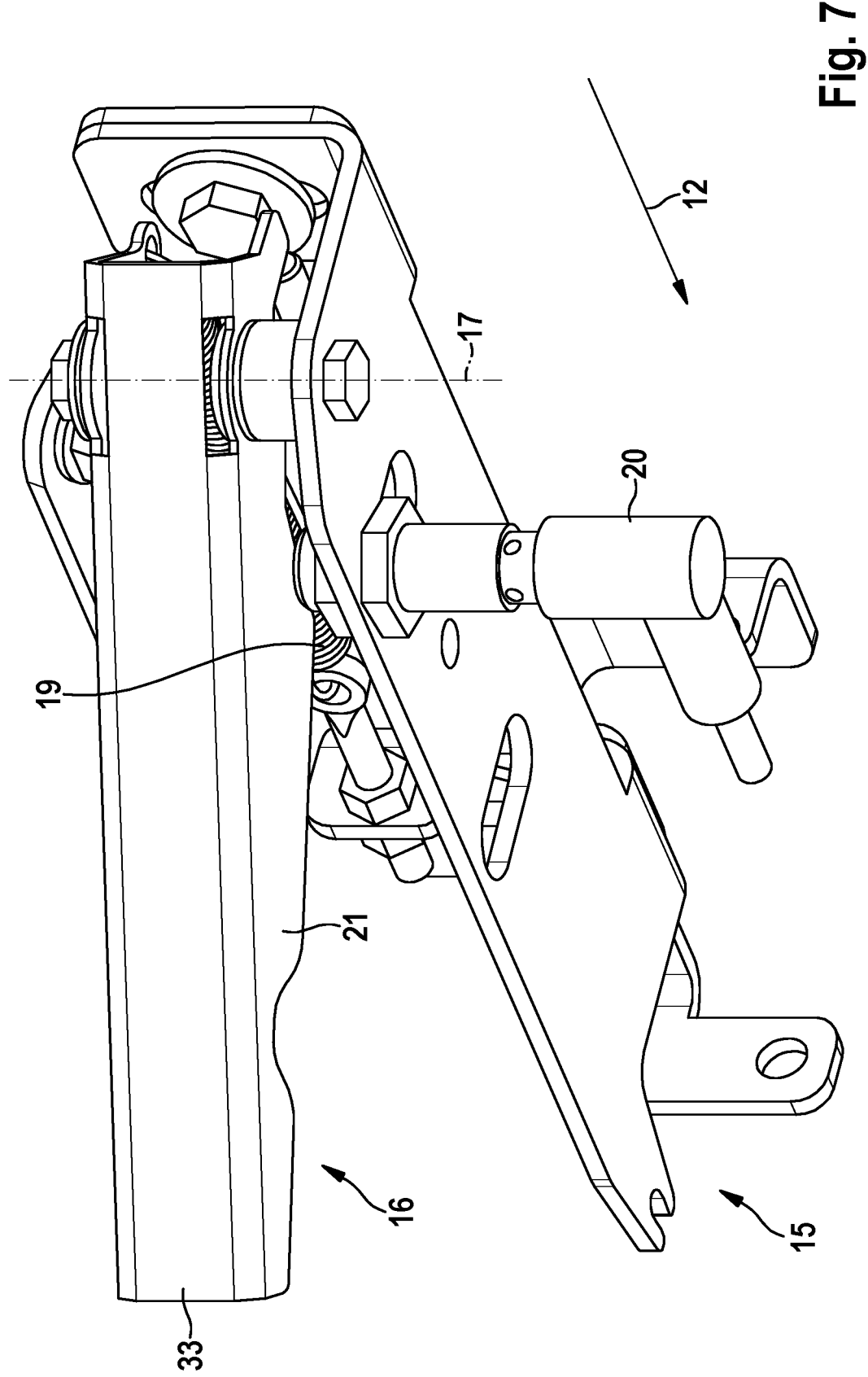
FIG. 7 is an enlarged view of the measuring device according to the invention, looking in the conveying direction.
Figure 8:
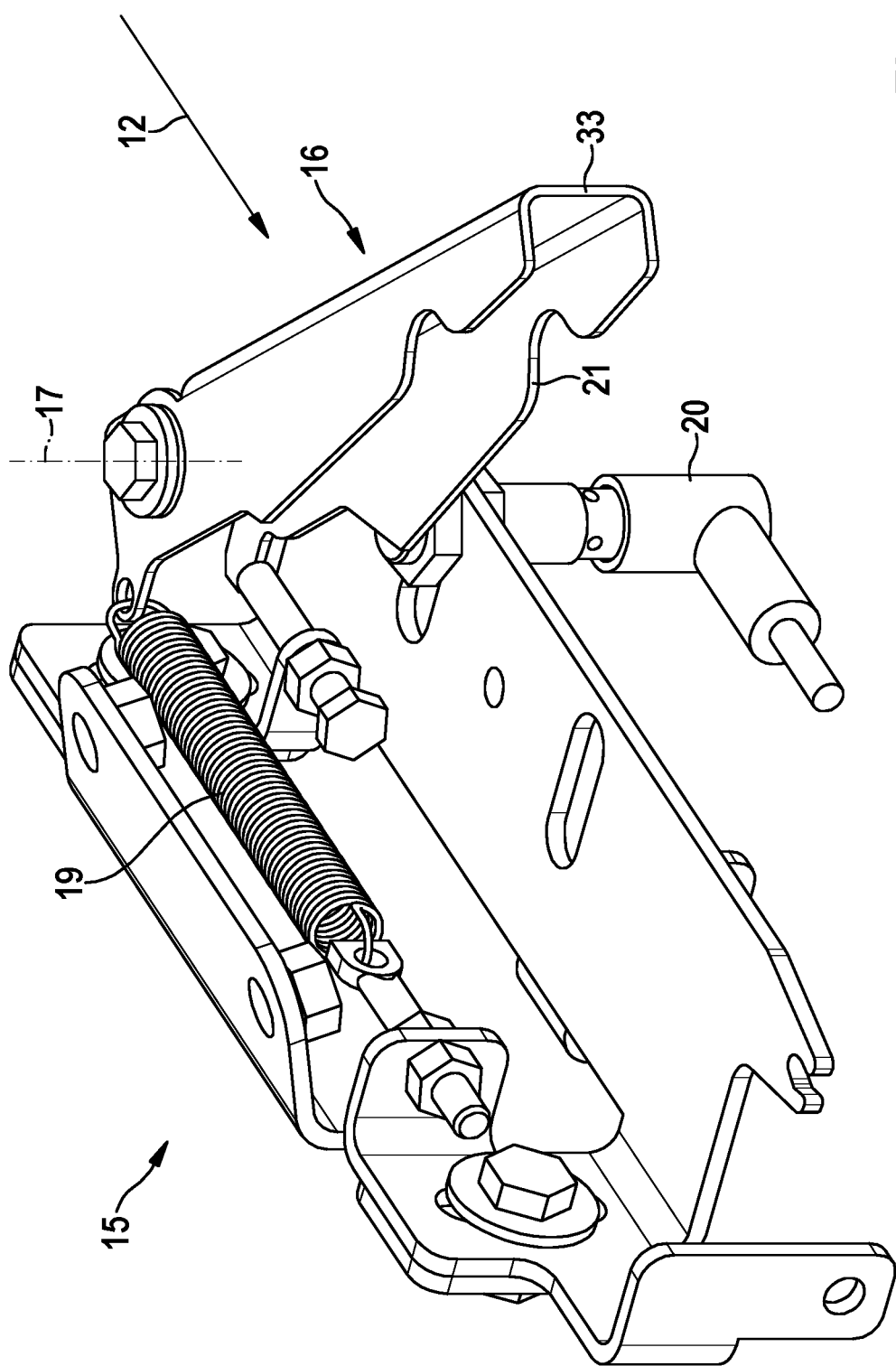
FIG. 8 is an enlarged view of the measuring device according to the invention, looking in the opposite direction to the conveying direction.

FIGS. 7 and 8 are each enlarged views of the measuring device 15 according to the invention, on the one hand looking in the conveying direction 10 and on the other hand looking in the opposite direction to the conveying direction 10. For the spring biasing of the scanning element 16, the scanning element is preferably in the form of a two-armed lever, on one lever arm of which there is arranged a spring element 19 in the form of a coil spring.

As is shown in FIG. 7, in a waiting position in which the scanning element 16 is not in mechanical contact with a poultry body 11, the scanning element 16 is in a position in which the scanning element 16, starting from the pivot axis 17, is oriented obliquely relative to the processing path 13. If one of the poultry bodies 11 comes into mechanical contact with the scanning element as it is conveyed past, the poultry body 11 displaces the scanning element 16 away from the processing path 13 by a pivoting movement about the pivot axis 17.

Further preferably, the measuring device 15 comprises at least one sensor element 20. The sensor element 20 is configured and adapted to detect at least one angular position on deflection of the scanning element 16. Preferably, the sensor element 20, as shown in FIGS. 7 and 8, is in the form of an inductive sensor, by means of which the position of the side surface 21 of the scanning element 16 is detected. In particular, the sensor element 20 is arranged such that it is able to distinguish between at least two deflected positions of the scanning element 16. If a poultry body 11 is scanned by means of the scanning element 16, the amount by which the scanning element 16 is deflected depends on whether the breast fillet is still on the poultry body 11 or whether the poultry body is already free of the breast fillet.

If the breast fillet is still present in the poultry body 11, the scanning element is pivoted further away from the processing path 13 than is the case when the poultry body 11 is already free of the breast fillet. The sensor element 20 is therefore preferably adapted to detect the angular position which the scanning element 16 assumes on scanning one of the poultry bodies 11 on which the breast fillet is still present. In other words, the sensor element 20 is configured, as one of the poultry bodies 11 on which the breast fillet is still present passes, to detect the associated angular position of the scanning element 16. If one of the poultry bodies that is already free of the breast fillet passes the scanning element 16, the deflection of the scanning element is so slight that this angular position is not detected by the sensor element 20.

The sensor element 20 is distinguished in particular in that it detects the angular position of the scanning element 16 contactlessly. Alternatively, it is possible that the sensor element is in the form of a rotary encoder, in order to detect different angular positions of the scanning element 16.

The present invention comprises a control device—not shown in the drawing—which is configured to detect whether the poultry body 11 is or is not free of the breast fillet. The determination of the two states takes place on the basis of the above-mentioned at least one angular position of the scanning element 16.

Figure 3:
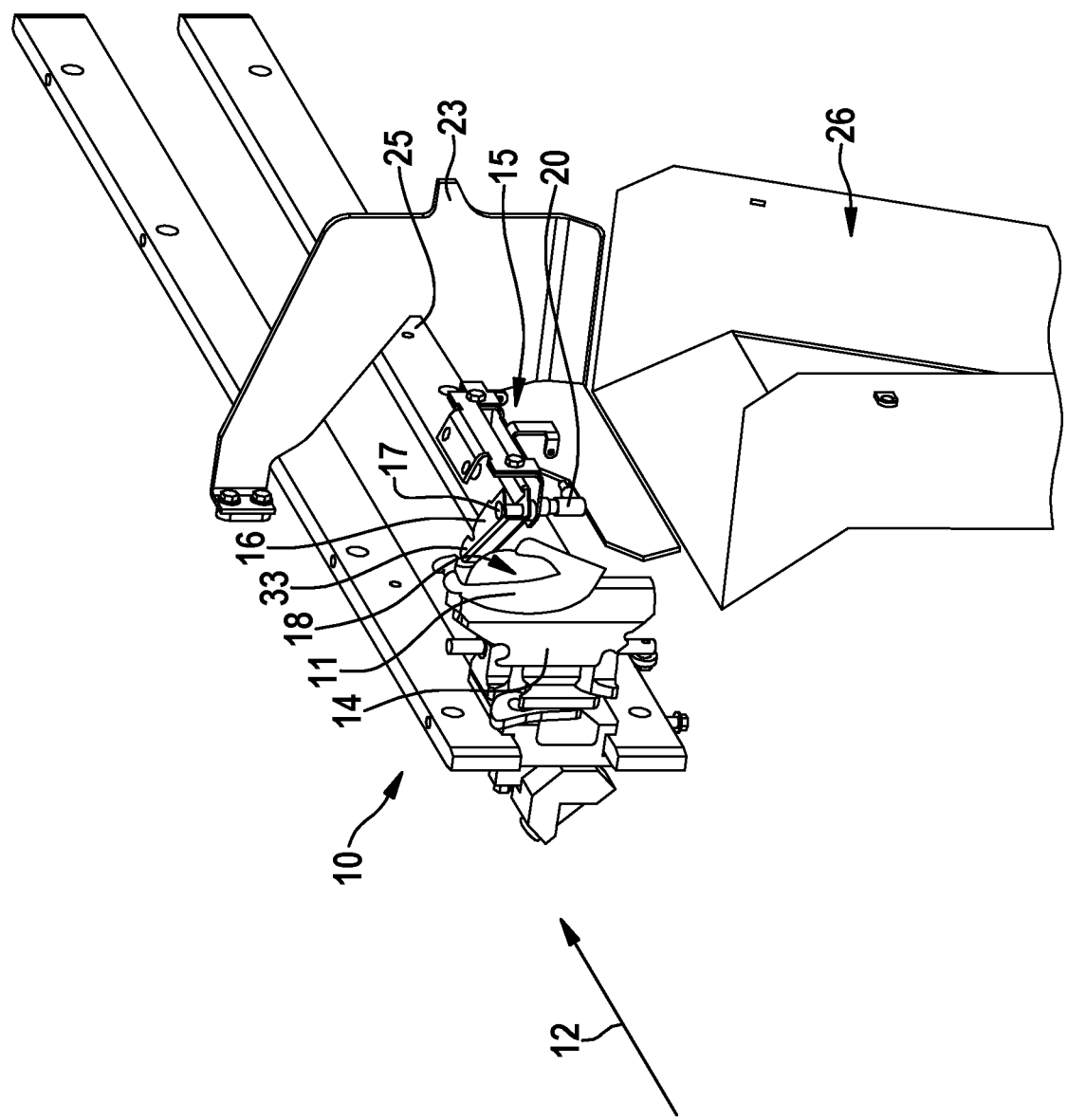
FIG. 3 is a detailed illustration of the mechanical scanning of the poultry body by means of the measuring device.

The apparatus according to the invention further comprises a discharge device 22 shown in FIGS. 1 to 3. The discharge device 22 has a take-off element 23. By means of the take-off element 23, the poultry bodies 11 are detached from the receiving elements 14. For this purpose, the conveying device 10 is adapted such that the orientation of each receiving element 14, on which one of the poultry bodies 11 is located, is changed before it passes the take-off element 23.

As is shown in FIG. 1, the receiving elements 14 are so oriented that the poultry bodies 11, in respect of their sternum, are oriented perpendicularly to the conveying direction 12. FIG. 1 shows how the orientation of one of the receiving elements is changed by means of the conveying device 10 shortly before it passes the take-off element 23 so that this one receiving element 24 is oriented with the sternum parallel to the conveying direction 11.

The take-off element 23 comprises a lead-through recess 25, the geometry of which is so chosen that, although the longitudinally oriented receiving element 24 is able to pass the take-off element 23 through the lead-through recess 25, the poultry body 11 is held back by the take-off element 23. As a result, the poultry body 11 is removed from the receiving element 14 and falls by gravity into the discharge shaft 26.

Figure 5:
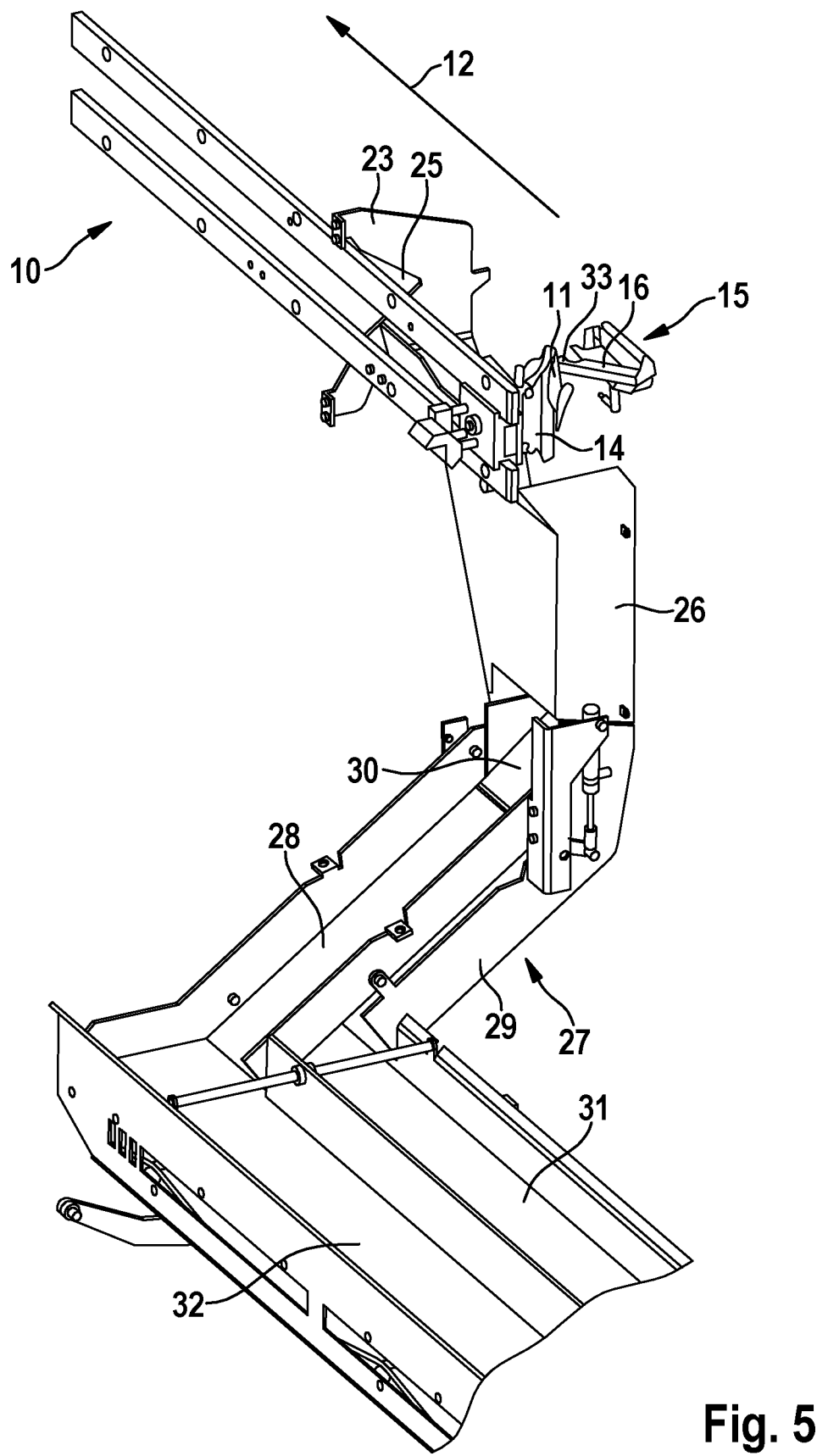
FIG. 5 shows the view shown in FIG. 1 with the flap element in a second position.
Figure 6:
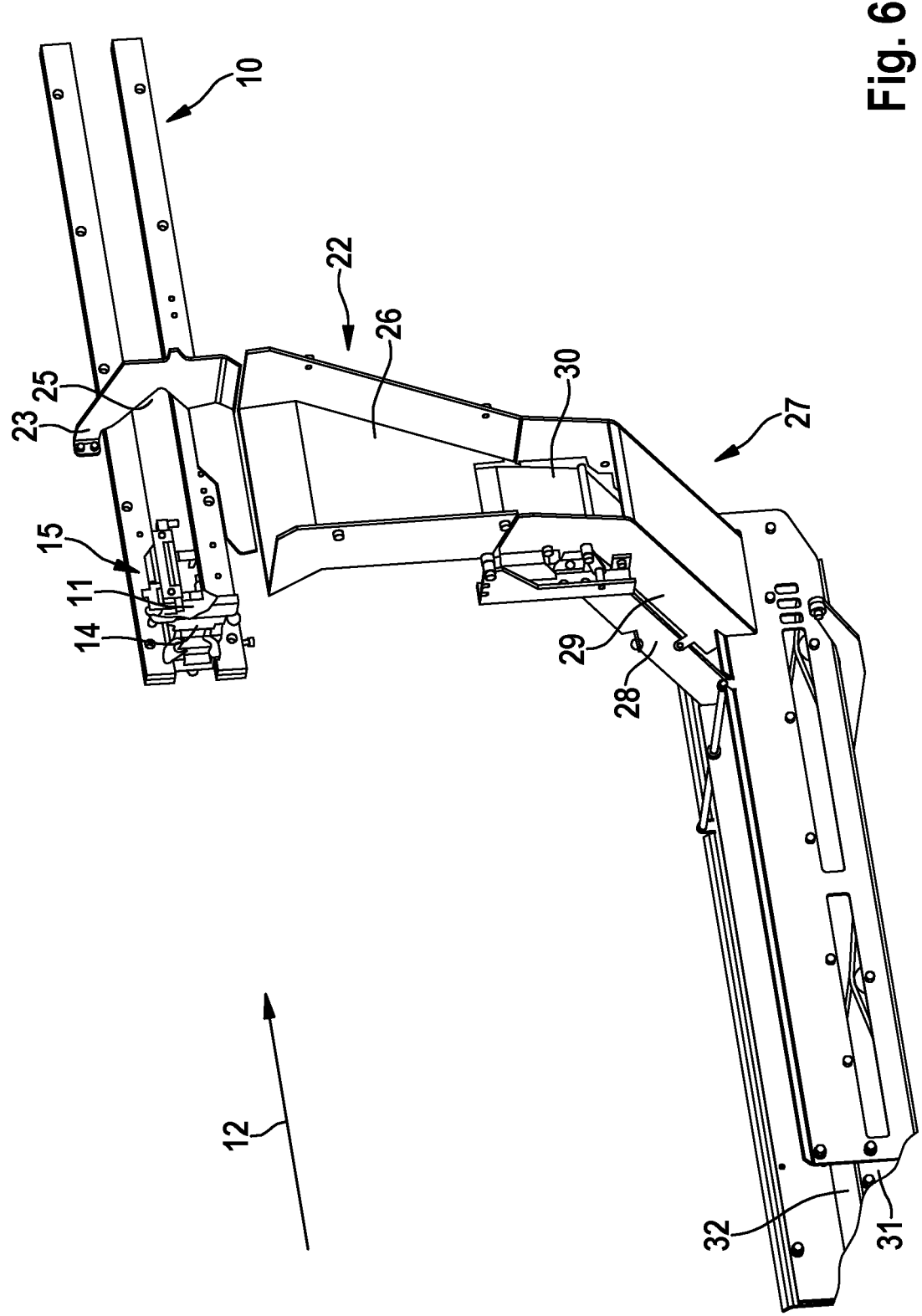
FIG. 6 is a view of the apparatus according to the invention with a discharge device.

The further function of the discharge device 22 will be explained in greater detail hereinbelow with reference to FIGS. 4, 5 and 6. FIG. 6 shows how the discharge shaft 26 merges into a double slide arrangement 27. This double slide arrangement 27 comprises an upper slide 28 and a lower slide 29, which are arranged one above the other. At the transition between the discharge shaft 26 and the double slide arrangement 27 there is a pivotable guiding flap 30, which is configured so as to be controllably movable by means of the control device between the guiding flap positions shown in FIGS. 4 and 5.

Figure 4:
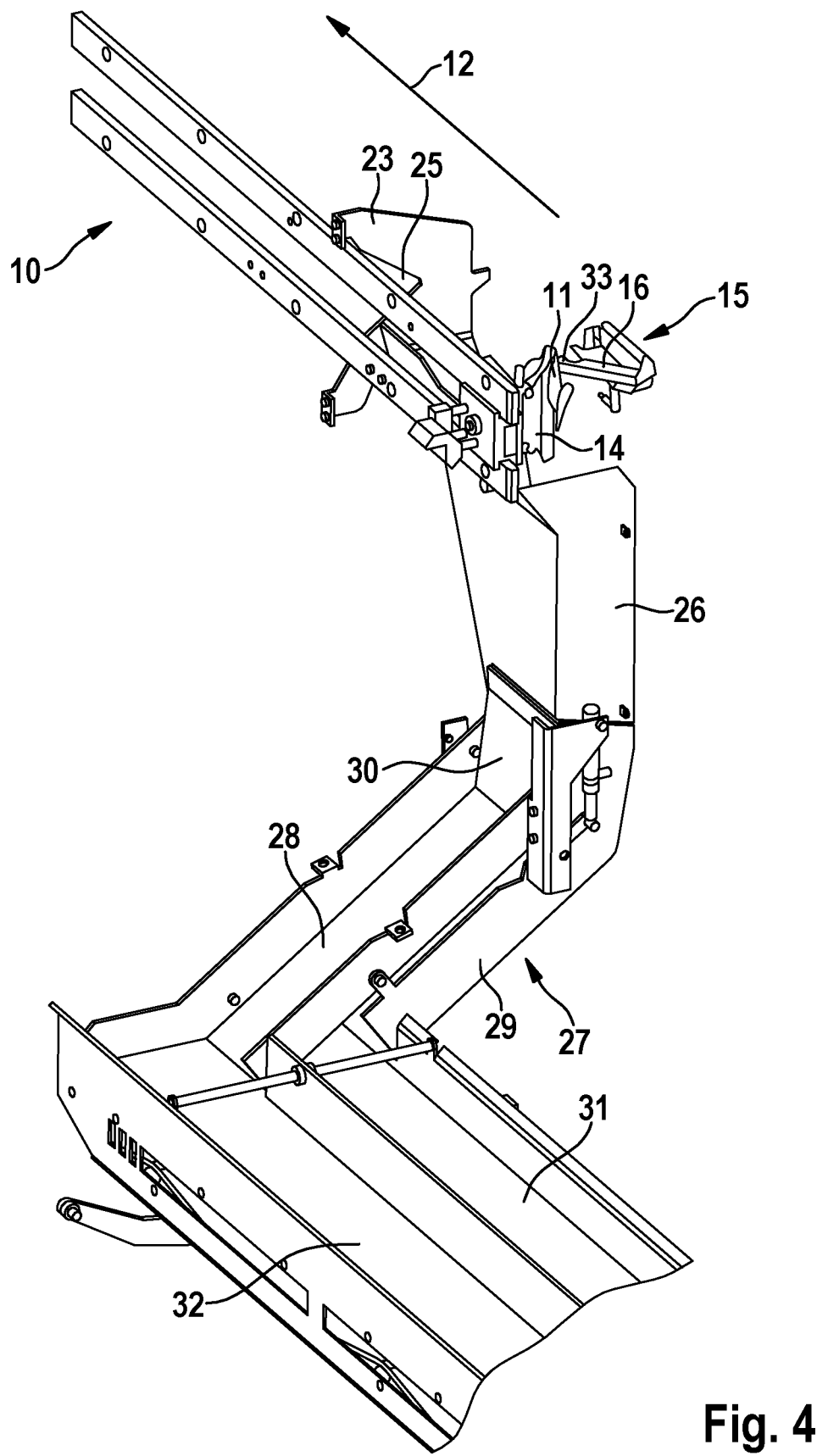
FIG. 4 is a rear view of the apparatus shown in FIG. 1 with a flap element in a first position.

If the guiding flap 30 is in the first guiding flap position shown in FIG. 4, the upper slide 28 is blocked and the poultry bodies 11 are guided to the lower slide 29. In the opposite case, which is shown in FIG. 5, the guiding flap 30 is in a second guiding flap position, in which the lower slide 29 is blocked and the poultry bodies 11 are guided via the guiding flap 30 to the upper slide 28. The upper slide 28 and the lower slide 29 open into two conveyor belts 31, 32 which are arranged parallel to one another and by means of which the poultry bodies 11 are conveyed to further stations, not shown in the drawings.

The control device is configured, in dependence on the detection of the presence of breast fillet on the poultry body 11 in question, always to feed that poultry body 11 to the same conveyor belt 31, 32, in accordance with a control command, by changing the position of the guiding flap 30 above the double slide arrangement 27. Alternatively, activation of the guiding flap 30 by the control device can take place on detection of a poultry body 11 that is free of breast fillet.

The present invention also comprises a method for automatically recovering breast fillets from poultry bodies 11 or parts thereof. The steps of the method according to the invention follow in an analogous manner from the apparatus according to the invention explained hereinbefore. Therefore, in order to avoid repetition, only selected aspects of the method according to the invention will be discussed hereinbelow.

The method comprises the steps: continuously conveying the poultry bodies 11 in a conveying direction 12 by means of the conveying device 10; carrying out the removal of the furcula by means of the furcula-removal station—not shown in the drawing; carrying out at least one processing step for partially or completely detaching the breast fillet by means of the breast fillet detaching station—not shown in the drawing; conveying the poultry bodies 11 held by means of the receiving elements 14 past the measuring device 15. The poultry bodies 11 are oriented transversely or substantially transversely to the conveying direction 12 and face the measuring device 15 with their breast sides. Finally, mechanical scanning of the poultry bodies 11 by means of the scanning element 16 of the measuring device 15 is carried out.

As the poultry bodies 11 are conveyed past the scanning element 16, the scanning element is preferably deflected, against the spring biasing of the scanning element 16, about the pivot axis 17.

The invention claimed is:

1. An apparatus for automatically recovering breast fillets from poultry bodies or parts thereof, comprising:
   a conveying device configured to continuously convey the poultry bodies in a conveying direction, the conveying device having receiving elements adapted to hold and convey the poultry bodies along a processing path, wherein processing stations are arranged on the processing path and the processing stations include at least a furcula-removal station and a breast fillet detaching station;
   at least one measuring device arranged downstream of the breast fillet detaching station in the conveying direction and arranged on the processing path, the poultry bodies held by the receiving elements being conveyed past the at least one measuring device such that in each case a sternum of the poultry bodies is oriented at least substantially transversely to the conveying direction with a breast side facing the measuring device;
   wherein the at least one measuring device has a scanning element which is configured and adapted to mechanically scan the poultry body on the breast side.

2. The apparatus according to claim 1, wherein the scanning element is pivotably mounted, with spring biasing, about a pivot axis.

3. The apparatus according to claim 2, wherein a free pivot arm end of the scanning element is oriented so as to point, starting from the pivot axis, in the conveying direction.

4. The apparatus according to claim 1, wherein the scanning element, in a waiting position in which it is not in mechanical contact with one of the poultry bodies, is arranged, starting from the pivot axis, in an oblique position relative to the processing path, pointing towards the processing path.

5. The apparatus according to claim 1, wherein the at least one measuring device comprises at least one sensor element which is configured and adapted to detect at least one angular position on deflection of the scanning element.

6. The apparatus according to claim 5, wherein the sensor element is an inductive sensor.

7. The apparatus according to claim 5, further comprising a control device which is configured to detect, on the basis of the at least one angular position, whether the poultry body has been freed of the breast fillet or whether the breast fillet is still present on the poultry body.

8. The apparatus according to claim 7, further comprising a discharge device which is arranged downstream of the measuring device in the conveying direction and is adapted so as to be controllable and which is configured so as to be activated by the control device, in the case of the detection of a presence of breast fillet on the poultry body in question, for a discharge of that poultry body and to discharge the poultry body in question.

9. The apparatus according to claim 7, wherein the control device is configured to detect a presence of the breast fillet on one of the poultry bodies by means of an angular position of the scanning element which is greater than a predefined reference angular position.

10. A method for automatically recovering breast fillets from poultry bodies or parts thereof, comprising the steps:
   continuously conveying the poultry bodies in a conveying direction by means of a conveying device, wherein the conveying device has receiving elements adapted to hold and convey the poultry bodies along a processing path, and wherein processing stations are arranged on the processing path, which processing stations include at least a furcula-removal station and a breast fillet detaching station;
   carrying out a removal of a furcula by means of the furcula-removal station;
   carrying out at least one processing step for a partial or complete detachment of the breast fillet by means of the breast fillet detaching station;
   conveying the poultry bodies held by means of the receiving elements past at least one measuring device arranged on the processing path downstream of the breast fillet detaching station in the conveying direction, such that in each case a sternum of the poultry bodies is oriented at least substantially transversely to the conveying direction with a breast side facing the measuring device; and
   mechanically scanning the poultry bodies by means of a scanning element of the measuring device.

11. The method according to claim 10, wherein the scanning element is deflected, against spring biasing, about a pivot axis as the poultry bodies are conveyed past.

12. A method according to claim 10, wherein at least one angular position is detected by at least one sensor element of the measuring device on deflection of the scanning element.

13. A method according to claim 12, wherein the at least one angular position is detected inductively by means of the sensor element.

14. A method according to claim 12, wherein a control device detects whether the poultry body has been freed of the breast fillet or whether the breast fillet is still present on the poultry body, on the basis of the at least one angular position.

15. A method according to claim 14, further comprising discharging one of the poultry bodies by means of a discharge device by activation of the discharge device by means of the control device in the case of the detection by means of the measuring device of the presence of the breast fillet on the poultry body in question.

16. A method according to claim 14, wherein detection of the presence of the breast fillet on one of the poultry bodies is by detection of the angular position of the scanning element, which is greater than a predefined reference angular position.

* * * * *